(12) United States Patent
Miyaishi

(10) Patent No.: US 11,738,737 B2
(45) Date of Patent: Aug. 29, 2023

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventor: Hironori Miyaishi, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 81 days.

(21) Appl. No.: 17/620,803

(22) PCT Filed: Jun. 4, 2020

(86) PCT No.: PCT/JP2020/022099
§ 371 (c)(1),
(2) Date: Jul. 6, 2022

(87) PCT Pub. No.: WO2020/261918
PCT Pub. Date: Dec. 30, 2022

(65) Prior Publication Data
US 2022/0363234 A1  Nov. 17, 2022

(30) Foreign Application Priority Data
Jun. 24, 2019 (JP) ................................. 2019-116575

(51) Int. Cl.
*B60W 10/04* (2006.01)
*B60W 10/107* (2012.01)
*F16H 61/662* (2006.01)

(52) U.S. Cl.
CPC .......... *B60W 10/107* (2013.01); *B60W 10/04* (2013.01); *F16H 61/662* (2013.01)

(58) Field of Classification Search
CPC .... B60W 10/04; B60W 10/06; B60W 10/107; B60W 30/181; F16H 61/662; F16H 2061/66281; F16H 2061/66286
See application file for complete search history.

(56) References Cited

U.S. PATENT DOCUMENTS

| 2008/0119308 A1 | 5/2008 | Iwasa et al. |
| 2009/0298625 A1 | 12/2009 | Kodama et al. |
| 2012/0135841 A1* | 5/2012 | Watanabe ............ B60W 10/115 477/115 |

(Continued)

FOREIGN PATENT DOCUMENTS

| JP | 2008-128369 A | 6/2008 |
| JP | 2009-287727 A | 12/2009 |

(Continued)

*Primary Examiner* — Edwin A Young
(74) *Attorney, Agent, or Firm* — Foley & Lardner LLP

(57) ABSTRACT

A control device for a vehicle having: an engine; a variator arranged downstream of the engine in a power transmission path connecting the engine and drive wheels; a mechanical oil pump that is driven by the engine and supplies hydraulic pressure to the variator; and an electric oil pump that supplies hydraulic pressure to the variator, wherein the control device for the vehicle has a controller that executes a low standby control which downshifts the variator by moving a belt of the variator in a radial direction during stopping of the vehicle. The controller limits an output of the engine and increases an amount of oil discharged by the electric oil pump when executing the low standby control.

4 Claims, 3 Drawing Sheets

(56) References Cited

U.S. PATENT DOCUMENTS

| | | | |
|---|---|---|---|
| 2018/0106363 A1 | 4/2018 | Katakura et al. | |
| 2019/0024793 A1* | 1/2019 | Oota | F16H 59/18 |
| 2020/0318736 A1* | 10/2020 | Oota | B60W 10/101 |

FOREIGN PATENT DOCUMENTS

| | | |
|---|---|---|
| JP | 2012-163141 A | 8/2012 |
| JP | 2016-183765 A | 10/2016 |

\* cited by examiner

CONTROL DEVICE FOR VEHICLE AND CONTROL METHOD FOR VEHICLE

TECHNICAL FIELD

The present invention relates to control for a vehicle.

BACKGROUND ART

As disclosed in JP 2008-128369A, in a belt continuously variable transmission mechanism, a low standby control, which downshifts the belt continuously variable transmission mechanism by moving a belt in a vertical direction (radial direction) during stopping of a vehicle, may be performed. By performing a speed ratio low return during stopping of the vehicle by the low standby control, a speed ratio of the belt continuously variable transmission mechanism can be set to a speed ratio near the lowest speed ratio, that is, the maximum speed ratio, and the belt continuously variable transmission mechanism can be put on standby for restart.

SUMMARY OF INVENTION

During the low standby control, it is required to increase a hydraulic pressure in order to increase a thrust of a secondary pulley. However, when a rotation speed of a mechanical oil pump driven by power of a driving source is increased too much in order to increase the hydraulic pressure, there is a concern that an input torque to the belt continuously variable transmission mechanism may increase too much and the belt may slip in a circumferential direction on the contrary.

The present invention has been made in view of such a problem, and the object of the present invention is to achieve both suppression of the slip of the belt of the belt continuously variable transmission mechanism in the circumferential direction and increase in a low return speed during the low standby control.

A control device for a vehicle according to a certain aspect of the present invention is a control device for a vehicle which includes a driving source, a belt continuously variable transmission mechanism that is arranged downstream of the driving source in a power transmission path connecting the driving source and drive wheels, a mechanical oil pump that is driven by the driving source and supplies hydraulic pressure to the belt continuously variable transmission mechanism, and an electric oil pump that supplies hydraulic pressure to the belt continuously variable transmission mechanism. The control device includes a control unit that executes a low standby control which downshifts the belt continuously variable transmission mechanism by moving a belt of the belt continuously variable transmission mechanism in a radial direction during stopping of the vehicle. The control unit limits an output of the driving source and increases an amount of oil discharged by the electric oil pump when executing the low standby control.

According to another aspect of the present invention, a control method for a vehicle corresponding to the control device for the vehicle mentioned above is provided.

According to these aspects, the input torque to the belt continuously variable transmission mechanism can be suppressed by limiting an output of the driving source, and thus, the slip of the belt in the circumferential direction can be suppressed. In addition, by limiting the output of the driving source and compensating for an insufficient amount of oil by an electric oil pump, it is possible to increase the low return speed during the low standby control. Thus, according to these aspects, it is possible to achieve both suppression of the slip of the belt in the circumferential direction and increase in the low return speed during the low standby control.

DESCRIPTION OF EMBODIMENTS

Embodiments of the present invention will be described below with reference to the accompanying drawings.

Figure 1:
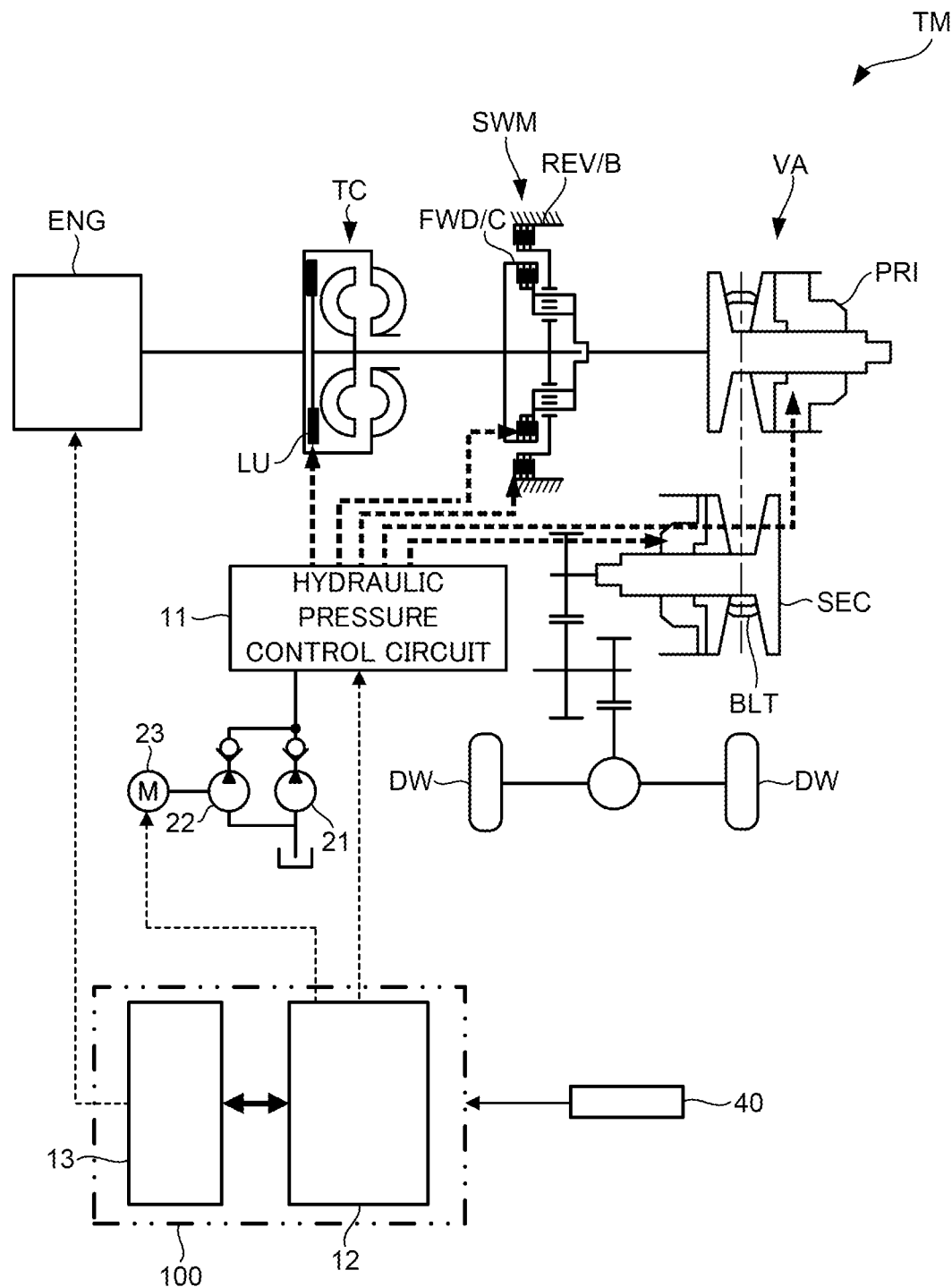
FIG. 1 is a schematic configuration diagram illustrating a vehicle.

FIG. 1 is a schematic configuration diagram illustrating a vehicle. The vehicle includes an engine ENG, a torque converter TC, a forward/reverse switching mechanism SWM, a variator VA, and a controller 100. In the vehicle, a transmission TM is configured using the torque converter TC, the forward/reverse switching mechanism SWM, and the variator VA, that is, as a configuration having the torque converter TC, the forward/reverse switching mechanism SWM, and the variator VA. The transmission TM is an automatic transmission, and in this embodiment, it is a belt continuously variable transmission. The transmission TM may be, for example, a step automatic transmission that performs shift in a stepwise manner.

The engine ENG constitutes a driving source of the vehicle. The power of the engine ENG is transmitted to drive wheels DW via the torque converter TC, the forward/reverse switching mechanism SWM, and the variator VA. In other words, the torque converter TC, the forward/reverse switching mechanism SWM, and the variator VA are provided in a power transmission path connecting the engine ENG and the drive wheels DW.

The torque converter TC transmits power via a fluid. In the torque converter TC, power transmission efficiency is improved by engaging a lock-up clutch LU.

The forward/reverse switching mechanism SWM is provided in the power transmission path connecting the engine ENG and the variator VA. The forward/reverse switching mechanism SWM switches the forward/reverse movement of the vehicle by switching a rotation direction of an input rotation. The forward/reverse switching mechanism SWM includes a forward clutch FWD/C, which is engaged when a forward range is selected, and a backward brake REV/B, which is engaged when a reverse range is selected. When the forward clutch FWD/C and the backward brake REV/B are disengaged, the transmission TM is put into a neutral state, that is, a power shut-off state.

The variator VA constitutes a belt continuously variable transmission mechanism having a primary pulley PRI, a secondary pulley SEC, and a belt BLT looped over the primary pulley PRI and the secondary pulley SEC. A primary pressure Ppri, which is a hydraulic pressure of the primary pulley PRI, is supplied to the primary pulley PRI, and a secondary pressure Psec, which is a hydraulic pressure of the secondary pulley SEC, is supplied to the secondary pulley SEC, respectively from a hydraulic pressure control circuit 11 which will be described later.

The transmission TM is configured further using a mechanical oil pump 21, an electric oil pump 22, and a motor 23.

The mechanical oil pump 21 pumps oil into the hydraulic pressure control circuit 11. The mechanical oil pump 21 is a mechanical oil pump driven by the power of the engine ENG.

The electric oil pump 22 pumps oil into the hydraulic pressure control circuit 11 together with the mechanical oil pump 21 or alone. The electric oil pump 22 is provided as an auxiliary to the mechanical oil pump 21. The motor 23 drives the electric oil pump 22. It may be understood that the electric oil pump 22 is configured using the motor 23.

The transmission TM is configured further using the hydraulic pressure control circuit 11 and a transmission controller 12.

The hydraulic pressure control circuit 11 is constituted of a plurality of flow passages and a plurality of hydraulic pressure control valves, and regulates the oil supplied from the mechanical oil pump 21, the electric oil pump 22 and supplies the oil to each part of the transmission TM.

The transmission controller 12 is a controller for controlling the transmission TM, and is mutually communicably connected to an engine controller 13 for controlling the engine ENG. For example, an output torque signal representing a torque TRQ of the engine ENG is input from the engine controller 13 to the transmission controller 12.

The transmission controller 12 constitutes a controller 100, which is a control device for a vehicle, with the engine controller 13. The controller 100 may be configured further using, for example, an integrated controller which performs integrated control for the transmission controller 12, the engine controller 13, etc.

Signals from a sensor/switch group 40 indicating various sensors/switches are input to the controller 100. The sensor/switch group 40, for example, includes a vehicle speed sensor that detects a vehicle speed VSP, an accelerator pedal opening sensor that detects an accelerator pedal opening APO, an engine rotation speed sensor that detects a rotation speed NE of the engine ENG, and a brake sensor that detects a brake hydraulic pressure.

The sensor/switch group 40 further includes, for example, a primary pressure sensor that detects the primary pressure Ppri, a secondary pressure sensor that detects the secondary pressure Psec, a primary rotation speed sensor that detects a rotation speed Npri which is an input-side rotation speed of the primary pulley PRI, a secondary rotation speed sensor that detects a rotation speed Nsec which is an output-side rotation speed of the secondary pulley SEC, a position sensor that detects an operation position of a shift lever, and an oil temperature sensor that detects an oil temperature of the transmission TM. The rotation speed Npri is, for example, a rotation speed of an input axis of the primary pulley PRI, and the rotation speed Nsec is, for example, a rotation speed of an output axis of the secondary pulley SEC.

These signals are directly input or input via the engine controller 13, etc. to the transmission controller 12. The transmission controller 12 controls the transmission TM based on these signals. The transmission TM is controlled by controlling the hydraulic pressure control circuit 11, the electric oil pump 22 based on these signals. The hydraulic pressure control circuit 11 performs hydraulic control for the lock-up clutch LU, the forward clutch FWD/C, the backward brake REV/B, the primary pulley PRI, the secondary pulley SEC, etc. based on instructions from the transmission controller 12.

The control of the transmission TM includes a low standby control. The low standby control is a control that moves the belt BLT in a vertical direction (radial direction) and downshifts the variator VA during stopping of the vehicle. By performing a speed ratio low return during stopping of the vehicle by the low standby control, a speed ratio IP can be set to a speed ratio near the lowest speed ratio, that is, the maximum speed ratio, and the variator VA can be put on standby for restart. The speed ratio IP is a speed ratio of the variator VA, and is a value obtained by dividing the rotation speed Npri by the rotation speed Nsec. The speed ratio IP is returned preferably to the maximum speed ratio by the low standby control.

During the low standby control, it is required to increase the hydraulic pressure in order to increase a thrust of the secondary pulley SEC. However, when a rotation speed Nmp of the mechanical oil pump 21 driven by the engine ENG is increased too much in order to increase the hydraulic pressure, there is a concern that an input torque to the variator VA may increase too much and the belt BLT may slip in the circumferential direction on the contrary.

In view of such circumstances, in this embodiment, the controller 100 executes a control to be described below.

Figure 2:
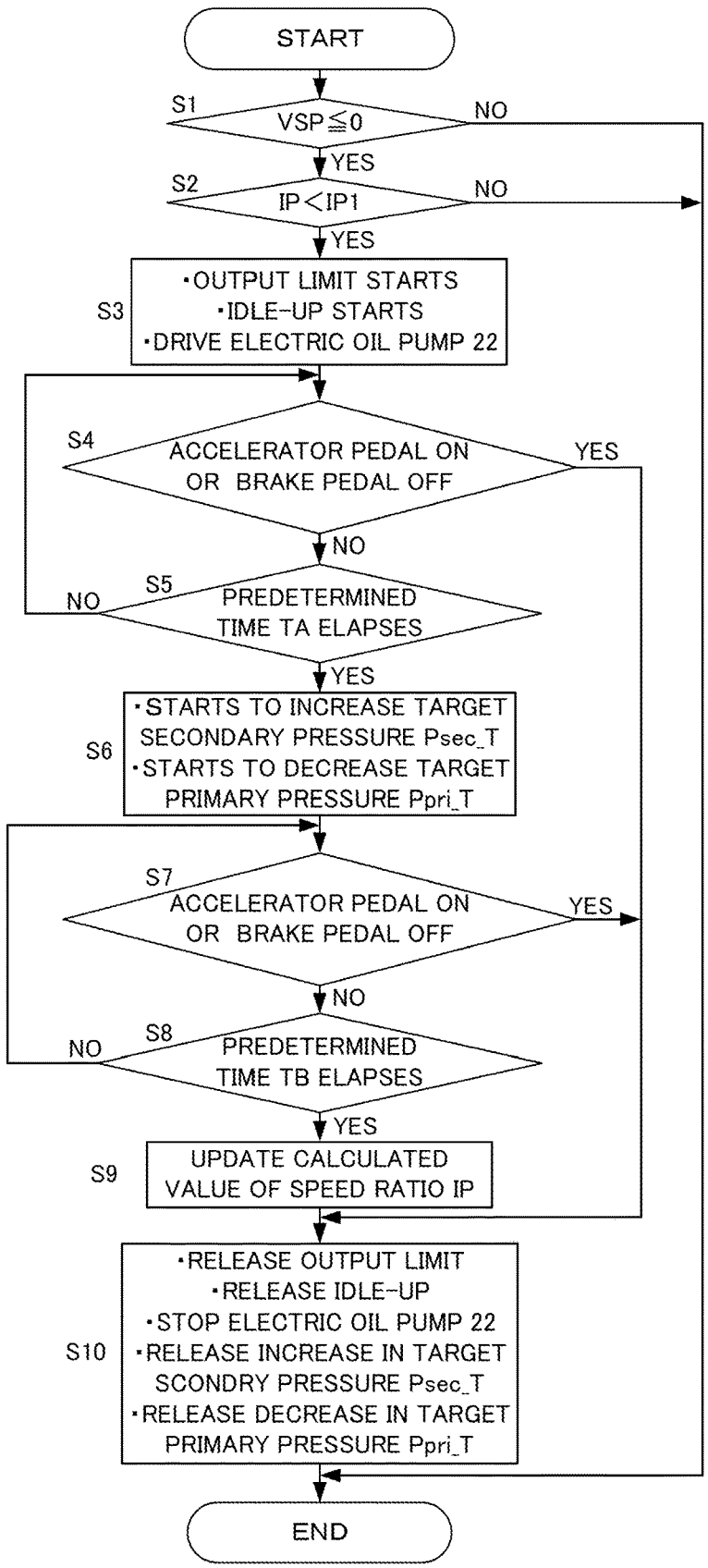
FIG. 2 is a flowchart showing an example of control performed in an embodiment.

FIG. 2 is a flowchart showing an example of control to be performed by the controller 100. The controller 100 is configured to have a control unit by being programmed to execute the process in this flowchart. The controller 100 can repeatedly execute the process in this flowchart.

In Step S1, the controller 100 determines whether the vehicle speed VSP is zero or less based on a signal from the vehicle speed sensor. If a negative determination is made in Step S1, the process is once terminated. If a positive determination is made in Step S1, it is determined that the vehicle is stopped and the process proceeds to Step S2.

In Step S2, the controller 100 determines whether the speed ratio IP is smaller than a predetermined speed ratio IP1. The predetermined speed ratio IP1 is a determination value for determining whether it is necessary to execute the low standby control, and is set in advance. If a negative determination is made in Step S2, the speed ratio IP is on a sufficiently low side, and thus, it is determined to be unnecessary to execute the low standby control, and the process is once terminated. If a positive determination is made in Step S2, the process proceeds to Step S3.

In Step S3, the controller 100 starts to limit the output of the engine ENG. This limits the input torque to the variator VA. Limiting the output of the engine ENG means limiting at least one of the torque TRQ and the rotation speed NE.

For example, when limiting the torque TRQ, limiting the output of the engine ENG means setting a threshold value for the torque TRQ and controlling the torque TRQ so as not to exceed the threshold value regardless of the accelerator pedal opening APO. The threshold value may be a constant value, or a variable value on the premise of setting a maximum upper limit threshold value. For example, in the variator VA, the allowable level of the torque TRQ changes according to the magnitude of the secondary pressure Psec, and thus, the threshold value may be set to be variable according to the magnitude of the secondary pressure Psec.

In Step S3, the controller 100 further starts an idle-up, that is, increasing the idle rotation speed of the engine ENG. The idle-up is performed within the output limit of the engine ENG. Thus, by increasing the rotation speed Nmp of the mechanical oil pump 21 as much as possible within the output limit of the engine ENG, it is possible to increase the amount of oil discharged by the mechanical oil pump 21 as much as possible.

In Step S3, the controller 100 further drives the electric oil pump 22. Thereby, the amount of oil discharged by the electric oil pump 22 is increased. The electric oil pump 22 is driven so as to compensate for a difference obtained by subtracting the amount of oil discharged by the mechanical oil pump 21 from a required oil amount of the transmission TM. Thus, the amount of oil discharged by the electric oil pump 22 is changed according to the amount of oil discharged by the mechanical oil pump 21.

Since this makes it possible to suppress the drive of the electric oil pump 22 to a necessary minimum drive, the power consumption of the electric oil pump 22 is reduced. The amount of oil discharged by the electric oil pump 22, which is changed according to the amount of oil discharged by the mechanical oil pump 21, may be set to zero. That is, when the vehicle is in a state where the mechanical oil pump 21 can sufficiently supply the required oil amount, the drive of the electric oil pump 22 may be prohibited.

In Step S3, these processes are performed in order to properly execute the low standby control. Hereinafter, these processes shown in Step S3 are also referred to as operation settings.

In Step S4, the controller 100 determines whether an accelerator pedal is ON or a brake pedal is OFF. If the accelerator pedal is OFF and the brake pedal is ON, it is determined that the vehicle will not restart. In this case, the process proceeds to Step S5.

In Step S5, the controller 100 determines whether a predetermined time TA has elapsed. The predetermined time TA is a determination value for determining whether the operation settings are completed, and is set in advance. If a negative determination is made in Step S5, the process returns to Step S4. Then, if the accelerator pedal is OFF and the brake pedal is ON until the predetermined time TA elapses, a positive determination is made in Step S5, and the process proceeds to Step S6.

In Step S6, the controller 100 starts to increase a target secondary pressure Psec_T and starts to decrease a target primary pressure Ppri_T. The target secondary pressure Psec_T is a pressure command value of the secondary pressure Psec. By increasing the target secondary pressure Psec_T, the thrust of the secondary pulley SEC is increased and the slip of the belt BLT in the circumferential direction is suppressed. The target primary pressure Ppri_T is a pressure command value of the primary pressure Ppri. By decreasing the target primary pressure Ppri_T, the belt BLT is moved in the vertical direction. The low standby control is performed by these processes.

During the low standby control, a fully engaged state of the forward clutch FWD/C is maintained. Thereby, the restarting ability of the vehicle can be improved as compared with the case where the forward clutch FWD/C is slipped or disengaged. The fully engaged state of the forward clutch FWD/C can be maintained at least when the road gradient is greater than or equal to a positive predetermined gradient. The predetermined gradient can be set in advance.

In Step S7, the controller 100 determines whether the accelerator pedal is ON or the brake pedal is OFF. That is, whether the vehicle is to be restarted is also determined during the low standby control. If a negative determination is made in Step S7, it is determined that the vehicle is not to be restarted, and the process proceeds to Step S8.

In Step S8, the controller 100 determines whether a predetermined time TB has elapsed. The predetermined time TB is a determination value for determining whether the low standby control is completed, and is set in advance. If a negative determination is made in Step S8, the process returns to Step S7. Then, if the accelerator pedal is OFF and the brake pedal is ON until the predetermined time TB elapses, a positive determination is made in Step S8, and the process proceeds to Step S9.

In Step S9, the controller 100 updates the calculated value of the speed ratio IP. This is because the speed ratio IP cannot be calculated based on the signals from the primary rotation speed sensor and the secondary rotation speed sensor since the rotation of the variator VA has been stopped during stopping of the vehicle. In Step S9, the calculated value of the speed ratio IP is updated from the speed ratio IP before the execution of the low standby control to the speed ratio IP after the low return is performed by the low standby control, that is, the maximum speed ratio.

In Step S10, the controller 100 releases the output limit and the idle-up of the engine ENG, and stops the electric oil pump 22. Further, in Step S10, the increase in the target secondary pressure Psec_T and the decrease in the target primary pressure Ppri_T are released. After Step S10, the process is once terminated.

If a positive determination is made in Step S4 or Step S7, it is determined that the vehicle is to be restarted. In this case, the process proceeds to Step S10. That is, when the vehicle is to be restarted, the operation settings and the low standby control are canceled. This prevents the low standby control from continuing against the driver's willingness to restart the vehicle.

Figure 3:
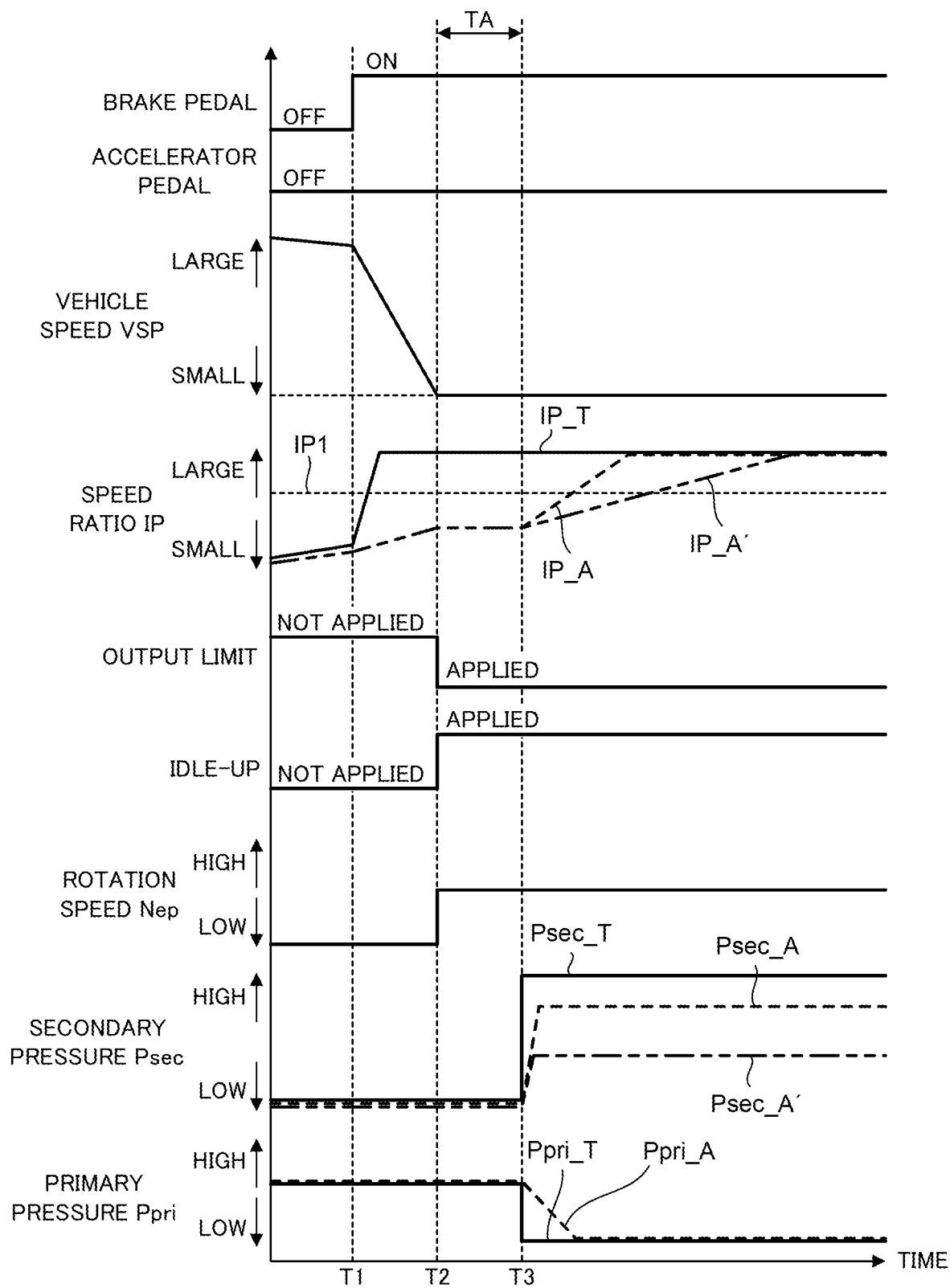
FIG. 3 is a timing chart showing an example of control performed in an embodiment.

FIG. 3 is a diagram illustrating an example of a timing chart corresponding to the flowchart illustrated in FIG. 2. The comparative example shown by the dashed double-dotted lines shows the case where oil is supplied only by the mechanical oil pump 21.

At the timing T1, the brake pedal is turned ON. As a result, the vehicle speed VSP starts to decrease significantly. Further, from the timing T1, the low return of the speed ratio IP during running of the vehicle is started. The low return during running of the vehicle is performed according to the vehicle speed VSP. Thus, a target speed ratio IP_T shown by a solid line starts to increase with a slope corresponding to the rapidly decreasing vehicle speed VSP. On the other hand, an actual speed ratio IP_A shown by a broken line cannot follow the target speed ratio IP_T and increases with a gentler slope than the target speed ratio IP_T from the timing T1.

At the timing T2, the vehicle speed VSP becomes zero. Thus, the rotation of the variator VA has been stopped since the timing T2. As a result, the low return during running of the vehicle cannot be performed, and the actual speed ratio IP_A becomes constant without returning to the maximum speed ratio. At this time, the actual speed ratio IP_A is smaller than the predetermined speed ratio IP1.

At the timing T2, the output limit of the engine ENG is started in such a situation. This limits the input torque to the variator VA and suppresses the slip of the belt BLT in the circumferential direction. At the timing T2, the idle-up is also started. This raises a rotation speed Nep of the mechanical oil pump 21 within the output limit of the engine ENG.

At the timing T3, the predetermined time TA elapses from the timing T2. Thus, the target secondary pressure Psec_T is increased and the target primary pressure Ppri_T is decreased. That is, the low standby control is started. Since the vehicle is being stopped, in the low standby control, downshift is performed by moving the belt BLT in the vertical direction while the primary pulley PRI and secondary pulley SEC of the variator VA remain non-rotating.

At the timing T3, with the start of the low standby control, an actual secondary pressure Psec_A, which is the actual pressure of the secondary pressure Psec, starts to increase, and an actual primary pressure Ppri_A, which is the actual pressure of the primary pressure Ppri, starts to decrease. As a result, the slip of the belt BLT in the circumferential direction is suppressed, the belt BLT moves in the vertical direction, and the variator VA downshifts. This makes it possible to increase the actual speed ratio IP_A even during stopping of the vehicle. The actual speed ratio IP_A finally becomes the maximum speed ratio, and the low standby control is completed.

Incidentally, the actual speed ratio IP_A during the low standby control is not actually measured. Further, in this example, the change before the predetermined time TB elapses from the timing T3 is shown. The low standby control is released when the predetermined time TB elapses from the timing T3.

The actual secondary pressure Psec_A at the time of the low standby control is larger than the actual secondary pressure Psec_A' in the comparative example shown by the dashed double-dotted line. This is due to the supply of hydraulic pressure from the electric oil pump 22 and this increases the thrust of the secondary pulley SEC, and thus, the slip of the belt BLT in the circumferential direction is suppressed. In addition, the actual speed ratio IP_A at the time of the low standby control has a larger slope of change than the actual speed ratio IP_A' in the comparative example shown by the dashed double-dotted line. This is because the supply of hydraulic pressure from the electric oil pump 22 improves the moving speed of the belt BLT in the vertical direction as compared with the case of the comparative example, and this makes it possible to increase the low return speed during the low standby control.

Major action and effect of this embodiment will be described next.

The control device for the vehicle according to this embodiment is a control device for a vehicle having: the engine ENG; the variator VA arranged downstream of the engine ENG in the power transmission path connecting the engine ENG and the drive wheels DW; the mechanical oil pump 21 that is driven by the engine ENG and supplies hydraulic pressure to the variator VA; and the electric oil pump 22 that supplies hydraulic pressure to the variator VA, wherein the control device for the vehicle has the controller 100 that executes the low standby control which downshifts the variator VA by moving the belt BLT of the variator VA in the vertical direction during stopping of the vehicle. The controller 100 limits the output of the engine ENG and increases the amount of oil discharged by the electric oil pump 22 when executing the low standby control.

According to such a configuration, the input torque to the variator VA can be suppressed by limiting the output of the engine ENG, and thus, the slip of the belt BLT in the circumferential direction can be suppressed. In addition, by limiting the output of the engine ENG and compensating for the insufficient amount of oil by the electric oil pump 22, it is possible to increase the low return speed during the low standby control. Thus, according to such a configuration, it is possible to achieve both suppression of the slip of the belt BLT in the circumferential direction and increase in the low return speed during the low standby control.

In this embodiment, the forward clutch FWD/C, which is an engaging element, is arranged in the power transmission path connecting the engine ENG and the drive wheels DW. Thus, the controller 100 maintains the fully engaged state of the forward clutch FWD/C during the low standby control at least when the road gradient is greater than or equal to a positive predetermined gradient.

According to such a configuration, the restarting ability of the vehicle can be improved as compared with the case where the input torque to the variator VA is lowered by slipping or disengaging the forward clutch FWD/C. Further, even when the fully engaged state of the forward clutch FWD/C is maintained in this way, the output of the engine ENG is limited, and thus, suppression of the slip of the belt BLT in the circumferential direction can be ensured.

The controller 100 changes the amount of oil discharged by the electric oil pump 22 according to the amount of oil discharged by the mechanical oil pump 21.

According to such a configuration, it is possible to reduce the power consumption of the electric oil pump 22 by setting the drive of the electric oil pump 22 to the necessary minimum drive.

While the embodiments of the present invention have been described above, the above-described embodiments only show part of application examples of the present invention and are not intended to limit the technical scope of the present invention to the specific configurations of the above-described embodiments.

In the foregoing embodiment, the case where the control unit is realized by the controller 100 has been described. However, the control unit may be realized by, for example, a single controller.

The present application claims a priority based on Japanese Patent Application No. 2019-116575 filed with the Japan Patent Office on Jun. 24, 2019, all the contents of which are hereby incorporated by reference.

The invention claimed is:

1. A control device for a vehicle having:
   a driving source;
   a belt continuously variable transmission mechanism that is arranged downstream of the driving source in a power transmission path connecting the driving source and drive wheels;
   a mechanical oil pump that is driven by the driving source and supplies hydraulic pressure to the belt continuously variable transmission mechanism; and
   an electric oil pump that supplies hydraulic pressure to the belt continuously variable transmission mechanism,
   the control device comprising:
   a controller configured to execute a low standby control which downshifts the belt continuously variable transmission mechanism by moving a belt of the belt continuously variable transmission mechanism in a radial direction during stopping of the vehicle,
   wherein the controller is configured to limit an output of the driving source and increases an amount of oil discharged by the electric oil pump when executing the low standby control.

2. The control device for the vehicle according to claim 1, wherein:
   an engaging element is arranged in the power transmission path; and
   the controller is configured to maintain a fully engaged state of the engaging element during the low standby control at least when a road gradient is greater than or equal to a positive predetermined gradient.

3. The control device for the vehicle according to claim 1, wherein:
   the controller is configured to change an amount of oil discharged by the electric oil pump according to an amount of oil discharged by the mechanical oil pump.

4. A control method for a vehicle having:

a driving source;

a belt continuously variable transmission mechanism that is arranged downstream of the driving source in a power transmission path connecting the driving source and drive wheels;

a mechanical oil pump that is driven by the driving source and supplies hydraulic pressure to the belt continuously variable transmission mechanism; and an electric oil pump that supplies hydraulic pressure to the belt continuously variable transmission mechanism, the control method comprising:

executing a low standby control which downshifts the belt continuously variable transmission mechanism by moving a belt of the belt continuously variable transmission mechanism in a radial direction during stopping of the vehicle; and limiting an output of the driving source and increasing an amount of oil discharged by the electric oil pump when executing the low standby control.

* * * * *